US011768941B2

(12) United States Patent
Godavarthi et al.

(10) Patent No.: US 11,768,941 B2
(45) Date of Patent: Sep. 26, 2023

(54) NON-ROM BASED IP FIRMWARE VERIFICATION DOWNLOADED BY HOST SOFTWARE

(71) Applicant: Intel Corporation, Santa Clara, CA (US)

(72) Inventors: Vinupama Godavarthi, Folsom, CA (US); Andrzej Mialkowski, Pomorskie (PL); Kar Leong Wong, Folsom, CA (US); Aditya Katragada, Austin, TX (US); Maciej Kusio, Folsom, CA (US); Prashant Dewan, Portland, OR (US); Karunakara Kotary, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 711 days.

(21) Appl. No.: 16/832,489

(22) Filed: Mar. 27, 2020

(65) Prior Publication Data

US 2021/0303692 A1 Sep. 30, 2021

(51) Int. Cl.
*G06F 21/57* (2013.01)
*G06F 21/78* (2013.01)
*G06F 12/0804* (2016.01)
*G06F 12/08* (2016.01)

(52) U.S. Cl.
CPC ........ *G06F 21/572* (2013.01); *G06F 12/0804* (2013.01); *G06F 21/575* (2013.01); *G06F 21/78* (2013.01)

(58) Field of Classification Search
CPC .. G06F 21/572; G06F 12/0804; G06F 21/575; G06F 21/78; G06F 21/44; G06F 9/44521
USPC ................................................. 713/1, 2, 100
See application file for complete search history.

(56) References Cited

U.S. PATENT DOCUMENTS

| 2016/0005454 | A1* | 1/2016 | Mun | G06F 9/4401 |
| | | | | 365/201 |
| 2019/0087578 | A1* | 3/2019 | Govindarajan | G06F 21/575 |
| 2019/0318097 | A1* | 10/2019 | Katragada | G06F 21/57 |

FOREIGN PATENT DOCUMENTS

CN 113449283 A 9/2021

\* cited by examiner

*Primary Examiner* — Michael J Brown
(74) *Attorney, Agent, or Firm* — JAFFERY WATSON MENDONSA & HAMILTON LLP (57) ABSTRACT

An apparatus to implement an IP independent secure firmware load into an IP agent without a ROM to establish hardware root of trust is disclosed. The apparatus includes a plurality of agents, at least one agent including an isolated memory region accessible only to a trusted entity of the at least one agent and a main memory, and a processor to allocate a section of the isolated memory region of the at least one agent, verify a first stage firmware module, the first stage firmware module comprising instructions to enable the at least one agent to load and verify a second stage firmware module, place the first stage firmware module into memory of the at least one agent without a ROM to establish the hardware root of trust.

21 Claims, 7 Drawing Sheets

NON-ROM BASED IP FIRMWARE VERIFICATION DOWNLOADED BY HOST SOFTWARE

BACKGROUND OF THE DESCRIPTION

A system on chip (SOC) is an integrated circuit that integrates all components of a computer or other electronic system. These components may include a central processing unit (CPU), memory, input/output (IO) ports and secondary storage, which are all included on a single substrate or microchip. Additionally, SOCs enable the integration of third party components via a standardized on-die interconnect protocol. However, the addition of such components may lead to security vulnerabilities.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for this disclosure may admit to other equally effective embodiments.

DETAILED DESCRIPTION

In the following description, numerous specific details are set forth to provide a more thorough understanding of various embodiments. However, it will be apparent to one of skill in the art that various embodiments may be practiced without one or more of these specific details. In other instances, well-known features have not been described in order to avoid obscuring any of the embodiments.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Designers of integrated circuits such as systems-on-a-chip (SoCs), microprocessors, microcontrollers, and other systems may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a graphics processing unit (GPU) engine, a security controller, and many other IP blocks. In many cases, each of these IP blocks has its own embedded microcontroller, and the microcontroller has its own architecture, instruction sets, and firmware loading requirements. Because there is no standardized microcontroller architecture or set of firmware loading requirements, custom firmware loading procedures may be designed for each IP block.

In an illustrative example, an SoC integrator integrates IP blocks with controllers designed in-house and externally across a wide range of vendors, architectures, bus interfaces, and boot time characteristics. These may all be designed independently of one another, particularly with respect to the loading of the firmware that runs on the microcontrollers of the IP blocks. There is presently no hardware standard that exists with respect to IP block firmware loading mechanisms. This can make IP integration with SoCs difficult and expensive.

The requirement for custom flows for IP firmware loading has drawbacks. For example, it prevents the re-use of designs with different IP blocks. In some instances, vendor lock-in may occur, because the SoC has been designed around the IP block of a particular vendor. Replacing the IP block with a functionally identical IP block from a different vendor may be expensive, because the firmware loading mechanism needs to be completely redesigned. This increases the cost of SoC and software integration. It also increases the effort required for security validation, and overall increases the cost of all stages of the security development lifecycle (SDL).

Some examples described herein may utilize a firmware load interface, also called a "dashboard," that provides a standard mechanism for loading firmware to an IP block. The hardware dashboard may be provided either internally within the IP block, or, for compatibility with legacy IP blocks that lack the firmware dashboard, the firmware dashboard itself could be provided as a separate IP block. The hardware dashboard has an IP-facing interface that provides customized instructions and processes specific to the IP, and also includes a system-facing interface that provides a standardized interface common to all IP blocks or classes of IP blocks. This provides a vendor-agnostic firmware load interface which ensures that if an IP block is replaced with a functionally similar or identical IP block from another vendor, the system does not need to be redesigned. This can provide either a direct, drop-in replacement (i.e., in a case where the firmware dashboard is provided internally to the IP block), or, at worst, the firmware dashboard IP is replaced with the corresponding firmware dashboard IP for the vendor of the new IP block. Other aspects of the system, including BIOS, firmware, and software, need not be compatible with the new IP block, because they are able to operate with the standardized firmware dashboard.

The firmware dashboard provides an interface that is not only vendor-agnostic, but also architecture-agnostic. ARM, AMD, Intel®, and other architectures can be integrated with any IP that provides a corresponding firmware dashboard. In cases where a trusted execution environment (TEE) is used for security, the firmware dashboard may also be compatible with, for example, Trusty, VBS, security controller, early BIOS, or any other TEE mechanism. This allows for TEE-agnostic loading of secure firmware for devices. For example, the firmware dashboard could be used on an ARM, AMD, or Intel® SoC, and may be used to integrate IP blocks from any number of vendors. This provides not only secure input/output (I/O), but also secure offloading of compute functionality to accelerators, which is useful in data centers.

The firmware dashboard of the present specification overcomes difficulties that arise because multiple architectures and multiple TEEs exist in common usage today. IP providers generally have their own, independently-designed hardware and custom expectations for software for their IP firmware. In the absence of a common mechanism, it can be very difficult for an SoC integrator to mix-and-match IP to multiple vendors. Furthermore, some vendors couple firmware loading of one IP with other IPs, thereby creating intractable dependencies. For example, if IP A is dependent on IP B to load secure firmware, and IP B is dependent on IP C and fabric D for its existence, the SoC design becomes challenging and sub-optimal.

The present specification implements a hardware widget known as a firmware load interface for a firmware "dashboard" that extracts information required for IP firmware loading and exposes a general standard interface external to the IP. Even though the IP is designed with custom flows, it has some generic expectations for external agents, and architecture for firmware verification and loading. The firmware dashboard disclosed herein uses these generalizations to create standard hardware widgets that are universally pluggable and provide a standard external flow for firmware loading and verification. Internal implementations on the IP side may still be different from IP to IP.

The firmware dashboard supports multiple styles of access control, including, for example, range-based, TLP bit-based, and access control based on boot stages. Furthermore, it encapsulates all interactions between the IP and the SoC, as well as the IP and other IPs inside the SoC for IP firmware management.

Advantageously, IPs may be designed independently of one another, which SoCs they're integrated into, and which OS or software are used on those SoCs. So with the firmware dashboard, IPs can be reused across many different architectures. Furthermore, software components such as BIOS or OS drivers may re-use IP firmware load modules from one IP to another, and also port from one platform to another, or from one ecosystem to another. This enables fast SoC integration with reduced validation costs in software for third-party IPs. It also provides improved security assurance with respect to IP firmware integrity, due to standardization.

The present specification illustrates the use of a firmware load interface, or dashboard, in terms of three types of IP blocks. It should be noted that these flavors are presented for illustrative purposes only, and that other types of IP blocks with other firmware load characteristics may be provided.

Type 1 is an IP with a read-only memory (ROM) and built-in hardware crypto. This IP block is able to establish its own root of trust, but depends on an external agent like an operating system or another controller to copy the firmware to an SoC-addressable memory for it to load. The IP may then use direct memory access (DMA) to access and verify the firmware, and to start executing it.

Type 2 is an IP with no ROM or crypto. It depends purely on an external entity to verify the integrity of the firmware, and download it into an internal random access memory (RAM), such as a static RAM (SRAM) or a register file.

Type 3 is an IP with no internal ROM or crypto. It expects an external agent to load and verify the firmware. The external agent must then point the firmware to the IP. The IP directly executes from that external memory.

A system and method for providing IP independent secure firmware load is described with more particular reference to the attached figures. It should be noted that throughout the figures, certain reference numerals may be repeated to indicate that a particular device or block is wholly or substantially consistent across the figures. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Certain of the figures below detail example architectures and systems to implement embodiments of the above. In some embodiments, one or more hardware components and/or instructions described above are emulated as detailed below or implemented as software modules.

Figure 1:
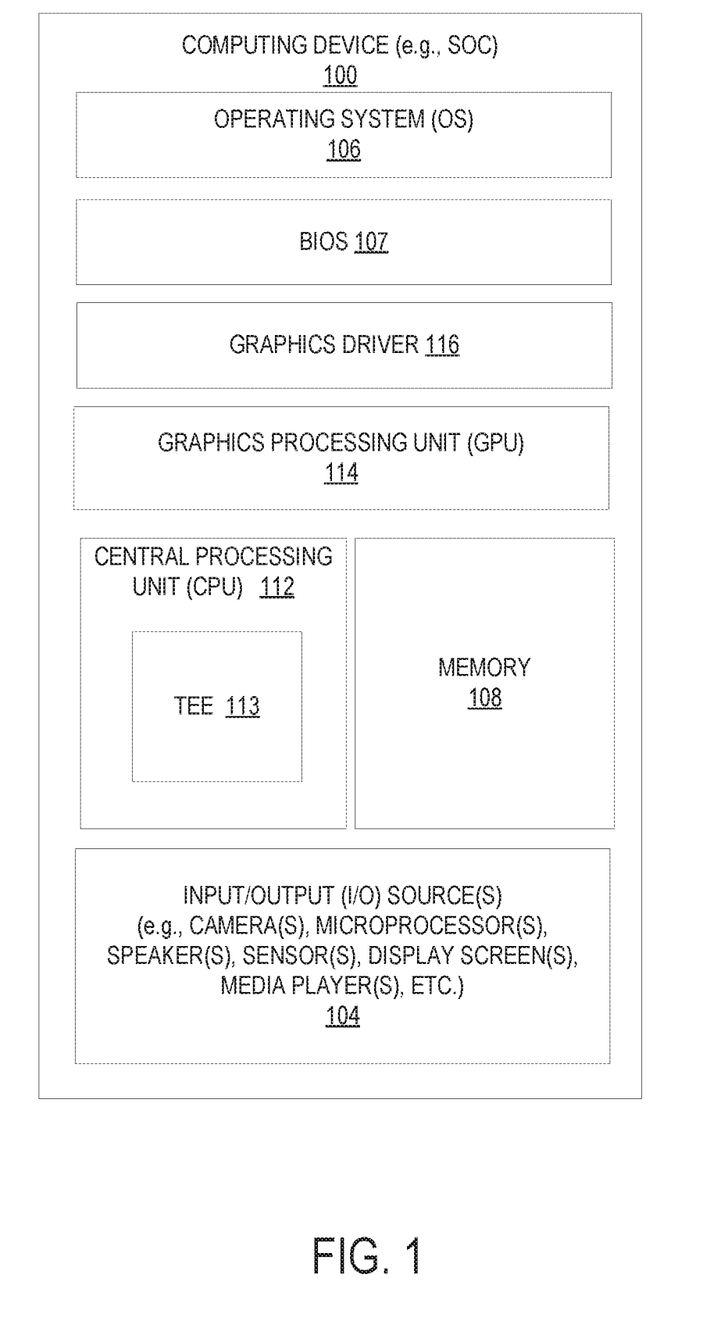
FIG. 1 is a schematic illustration of one embodiment of a computing device, according to examples.

FIG. 1 is a schematic illustration of one embodiment of a computing device, according to examples. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), a trusted execution environment (TEE) 113, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user and a basic input/output system (BIOS) 107 which may be implemented as firmware and reside in a non-volatile section of memory 108.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2A:
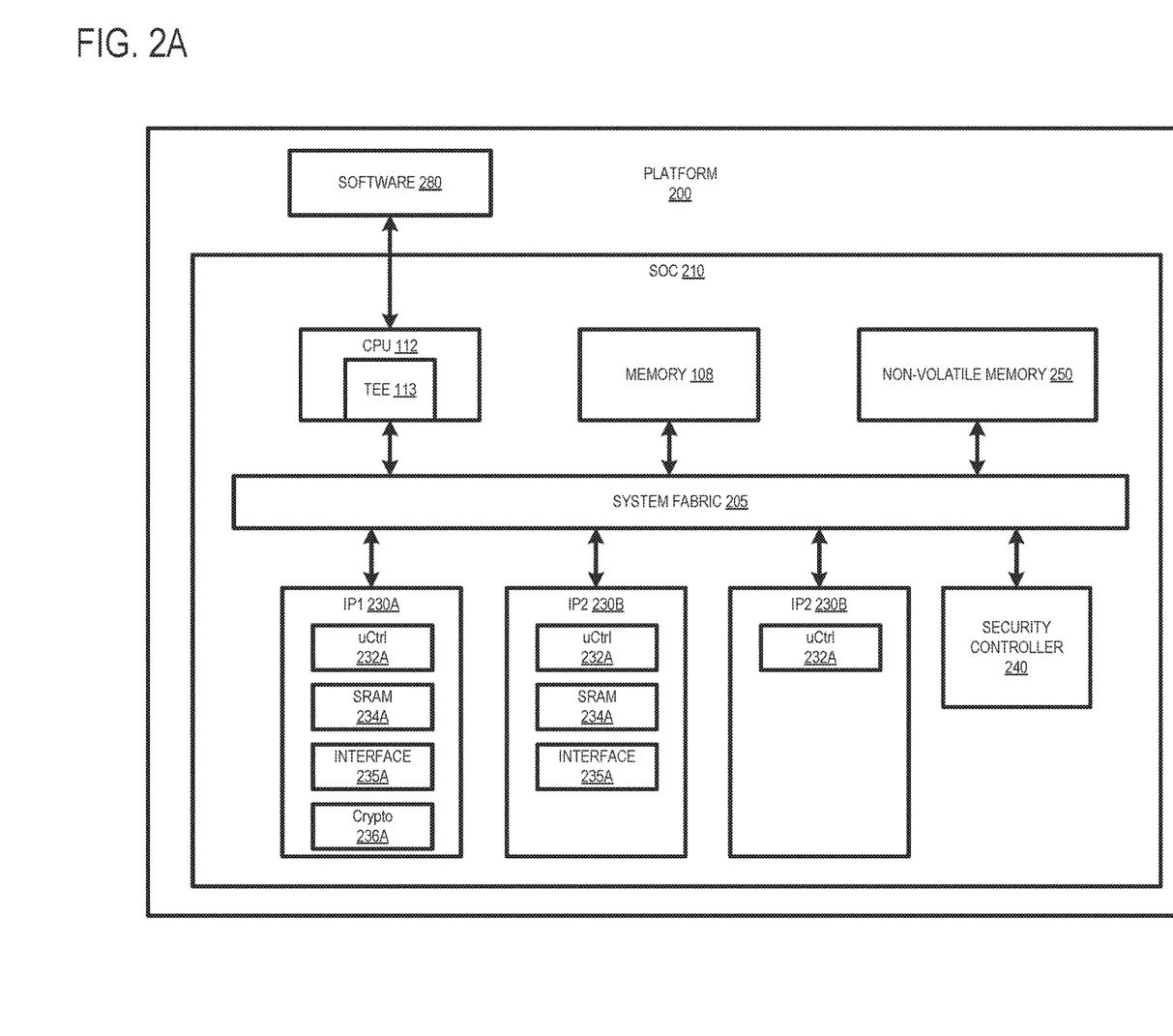
FIGS. 2A-2C are schematic illustrations of a computing platform, according to embodiments.
Figure 2B:
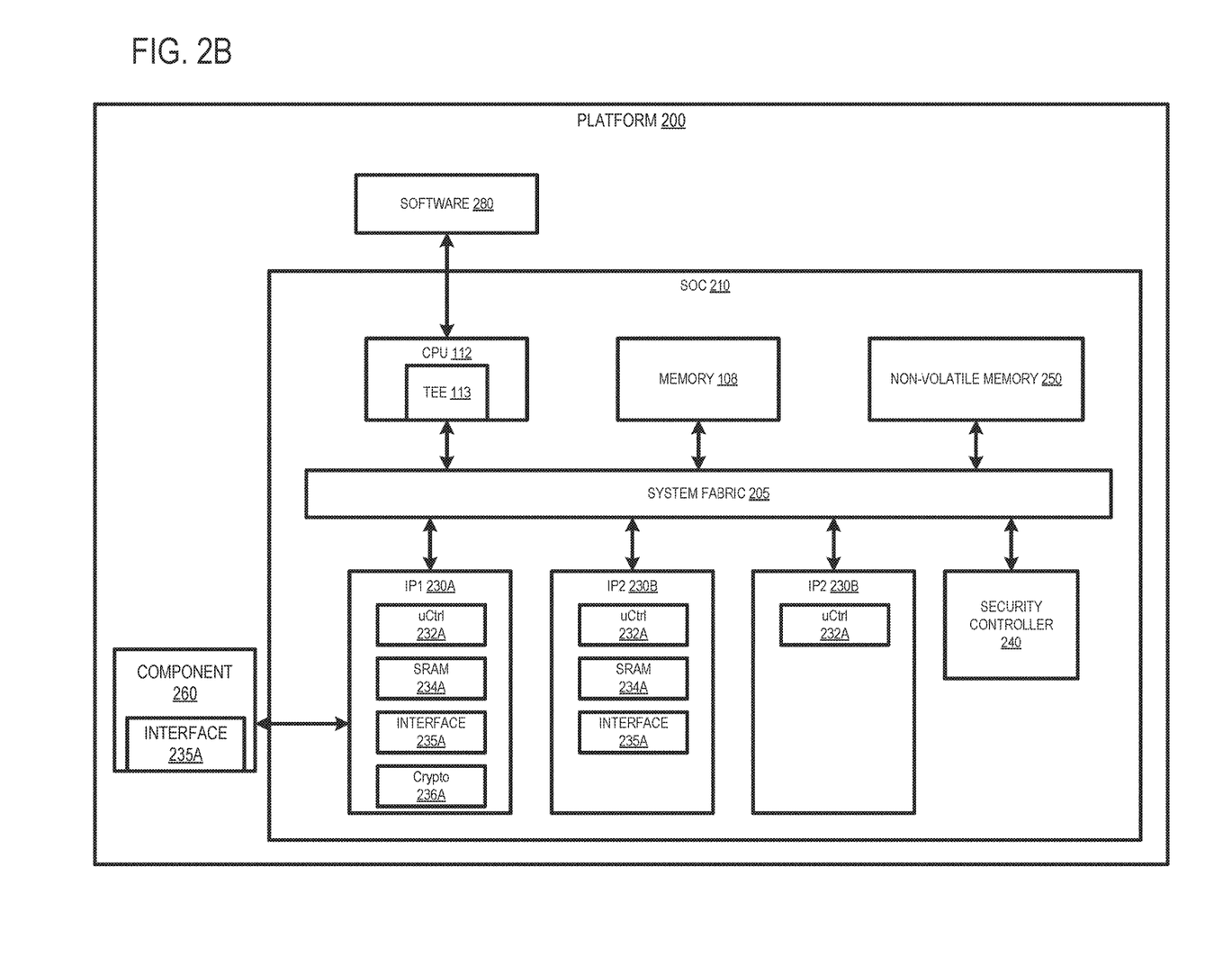
Figure 2C:
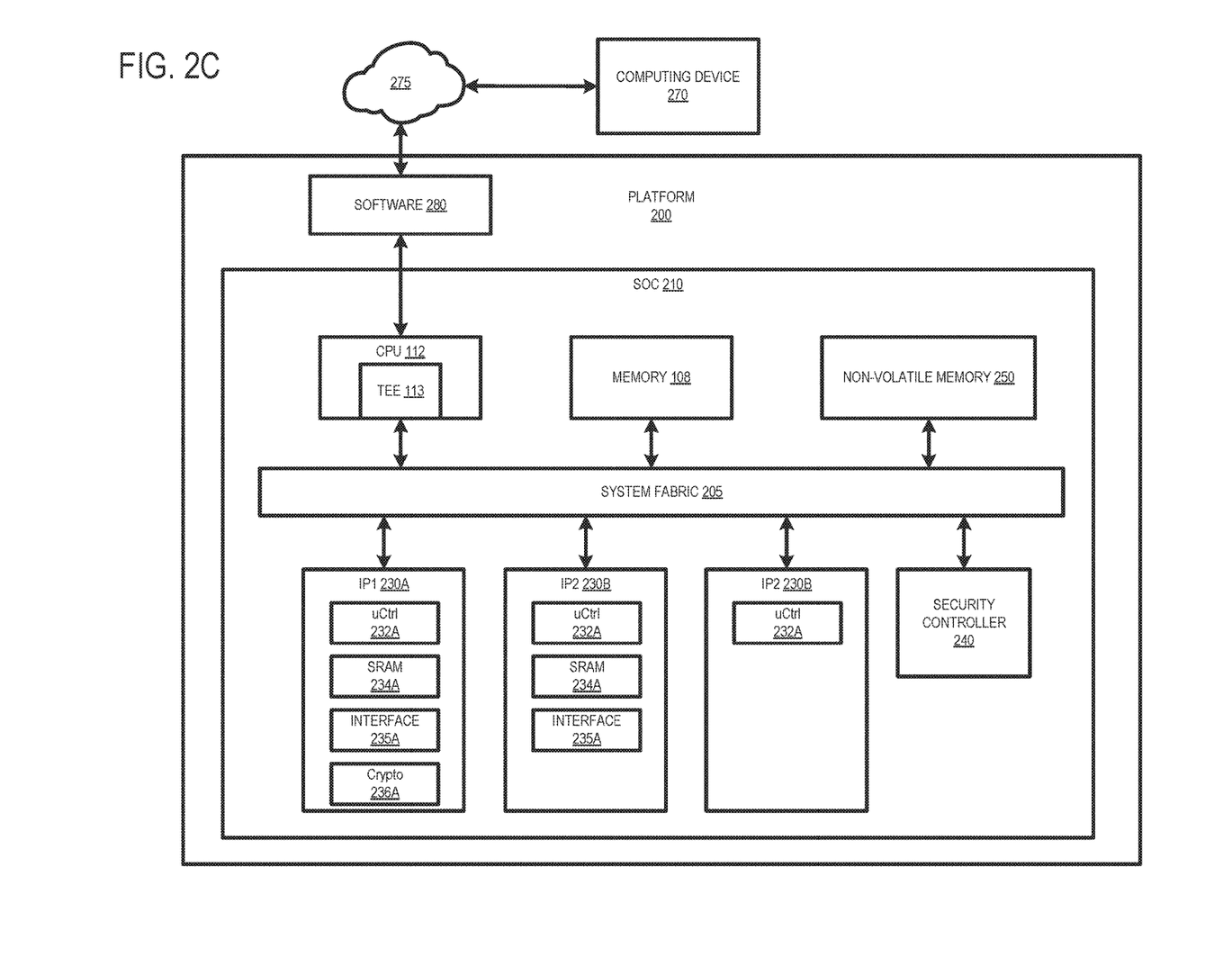

FIGS. 2A-2C are schematic illustrations of a computing platform, according to embodiments. In some examples the platform 200 may include a SOC 210 similar to computing device 100 discussed above. As shown in FIG. 2A, platform 200 includes SOC 210 communicatively coupled to one or more software components 280 via CPU 112. Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP blocks 230A and 230B) within SOC 210. In such an embodiment, the interconnect protocol provides a standardized interface to enable third parties to design logic such as IP agents 230 to be incorporated in SOC 210.

According to embodiment, IP agents 230 may include general purpose processors or microcontrollers 232 (e.g., in-order or out-of-order cores), fixed function units, graphics processors, I/O controllers, display controllers, etc., a SRAM 234, and may include a crypto module 236. In such an embodiment, each IP agent 230 includes a hardware interface 235 to provide standardization to enable the IP agent 230 to communicate with SOC 210 components. For example, in an embodiment in which IP agent 230 is a third-party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises an IP agent 240 that is implemented to perform the security operations. Further, SOC 210 includes a non-volatile memory 250. Non-volatile memory 250 may be implemented as a Peripheral Component Interconnect Express (PCIe) storage drive, such as a solid state drives (SSD) or Non-Volatile Memory Express (NVMe) drives. In one embodiment, non-volatile memory 250 is implemented to store the platform 200 firmware. For example, non-volatile memory 250 stores boot (e.g., Basic Input/Output System (BIOS)) and device (e.g., IP agent 230 and security controller 240) firmware.

FIG. 2B illustrates another embodiment of platform 200 including a component 270 coupled to SOC 210 via IP 230A. In one embodiment, IP 230A operates as a bridge, such as a PCIe root port, that connects component 260 to SOC 210. In this embodiment, component 260 may be implemented as a PCIe device (e.g., switch or endpoint) that includes a hardware interface 235 to enable component 260 to communicate with SOC 210 components.

FIG. 2C illustrates yet another embodiment of platform 200 including a computing device 270 coupled to platform 200 via a cloud network 210. In this embodiment, computing device 270 comprises a cloud agent 275 that is provided access to SOC 210 via software 280.

Modern SOCs integrate embedded IP sub-systems (IPSS), also referred to herein as IP agents, or just agents, to provide enhanced capabilities such as audio, sensing, image processing, etc. These IP agents download and execute complex firmware stacks. For ease of deployment, and flash size considerations, these firmware stacks are packaged and distributed with host software, typically drivers. Drivers execute on the host processor in the operating system environment may not be in the trust boundary of the IP agent. A trusted entity is required to verify the integrity of firmware stack downloaded by host software.

In some examples a ROM-based approach has been used to verify the integrity of the firmware stack to be implemented in an IP agent. In some examples, a dedicated IP-ROM includes verification logic as well embedded keys to verify the integrity of the firmware. This model requires that the firmware be verified and attested by the manufacturer, so it supports only manufacturer-signed firmware can be supported. Third party signed firmware cannot be supported. In this model a driver loads firmware in system memory that is visible to a host processor visible, and the IP agent ROM copies the firmware into an isolated/protected memory of the IP agent and verifies it using embedded keys. After successful verification, the IP agent may execute verified firmware. This model, while effective, raises numerous issues.

First, some IP agents neither include cryptographic hardware, nor do they have access to the platform components such as flash boot-media, trusted platform module, SOC fuses etc. To address these limitations and still support autonomous verification, signing keys ma need to be embedded in the ROM of an IP agent, and the IP ROM needs to include support for RSA verification and a hashing function to be verify driver loaded firmware. A ROM size of 32-64 KB is required to accommodate RSA-3k, and SHA-384. Including this in ROM necessitates increasing the size, complexity, and risk of an IP agent. Further, bug fixes, additional capabilities, or modes cannot be supported by a firmware update fix, instead a silicon stepping.

Second, depending on the platform configuration, the host environment may or may not be trusted. In trusted host environment where everything is trusted, signing and verification is redundant and may be avoided. In this scenario verification can simply be skipped. Determination to whether to skip verification is not done until platform configuration time and SKU based ROM is not always practical. Alternatively, straps and other input mechanisms to ROM increases the exposure for bugs, errors and potentially compromised security.

Third, in order to support OEM innovation and differentiation, IP agents that perform functions such as audio and sensing allow and support execution of third party developed code on their IP agents. Third party developed code is also signed by third party signing keys. Embedding IP vendor keys in IP ROM is practicable, however, embedding third party signing keys is not practical. Nor is it practical for a manufacturer to be the signing authority for third party code. A scalable solution needs to allow the OEM to provision their public signing keys via OEM programmable fuses or trusted platform module as OEM key provisioning occurs in their manufacturing line.

Fourth, since IP agents do not include support access to secure platform components, it cannot support anti-roll back to support save and restore of secure version number In other examples a converged security management engine (CSME) may be utilized in conjunction with an external keys management system. Due to external key management, both Intel and 3rd party signed FIRMWARE can be supported. In this approach, CSME IP verifies the integrity of firmware for other IPs using Intel or 3rd party signing keys. Driver loads firmware into system memory that is host processor visible. IP ROM copies firmware from host memory to an isolated/protected memory region and requests CSME to verify it. CSME verifies the firmware in isolated memory region and notifies IP verification status. Upon receiving successful verification indication from CSME, IP ROM executes verified firmware. This model also raises several issues.

First, this model does not have the limitations of IP-ROM approach described above, as unlike BIOS which is only available in early boot-phase, CSME is an always available service. However, it creates dependencies between IP agents requiring verification service and CMSE. A proprietary message interface is required between the ROM of an IP agent CSME to support this option.

Second, CSME is considered a black-box by customers as it does not provide the transparency and flexibility level desired by our customers. CSME involvement and enablement cost in support of debug and deployment of IP firmware is considered prohibitory in IP adoption by some customers.

Third, CMSE could be disabled in certain platform configurations such as high assurance platforms, or simply become non-functional for un-known reason on a small percentage of platforms in operating system environment as reported by customers. This renders the IP un-usable in such configurations as CSME is not available to render verification services for IP firmware.

Fourth, the dependency between IP agents creates a potential for bottlenecks and responsiveness delays during the boot flow as well as bottlenecks during execution, affecting time to market.

To enable verification of firmware loaded by an un-trusted entity, a trusted entity such as BIOS verifies and places a small ROM_EXTN module that includes the crypto logic (RSA, SHA, communication with host) as well the Intel and 3rd party signing keys in Isolated memory region (IMR) dedicated of the IP. When the IP comes out of reset, it simply jumps/executes to contents in its IMR. IP host SW driver, upon commencing communication with IP hardware/firmware, requests to download firmware. ROM_EXTN module processes the host driver requests and supports host download of the firmware and verified it using keys placed in IMR.

In some examples, these and other issues may be addressed by implementing at two-stage firmware loading model for IP agents in a platform. In some examples the first stage firmware is limited to instructions and the security elements (e.g., cryptography, keys, secure version numbers, verification logic, etc.) required to enable an IP agent to load the second stage firmware, which may be a complete functional firmware module. The first stage firmware loading process is performed by a trusted entity of the platform, which verifies and loads first stage firmware into a protected/isolated memory region of an IP agent. The IP agent executes the first stage firmware and autonomously verifies second stage firmware loaded by un-trusted entity.

By way of overview, early in the boot process the Secure Boot platform BIOS is considered a trusted entity and is in the trusted computing base (TCB) for most SOC IP agents. In some examples the BIOS may program the register via an interface, as described above. Embedded system IP agents typically include an isolated memory region in memory, which is setup by BIOS. In some examples the BIOS allocates and sets up protections for isolated memory regions, and the protections are enforced by the SOC hardware.

As mentioned above, the IP agent firmware is split into two parts and is loaded in two stages. The first stage firmware includes only the functionality required for the IP agent to load the second stage firmware and autonomously verify it. In some examples the first stage firmware may be provisioned in the platform flash at the time of manufacturing and is accessible by BIOS. The second stage firmware is packaged and distributed by a driver and resides in the operating system disk partition accessible by the driver.

In some examples the public keys required to verify firmware (including 3rd party firmware) are provisioned using already existing key provisioning mechanism—typically a key manifest in a flash with the root key in immutable/tamper resistant media such as fuses or Trusted platform module. The BIOS loads and verifies the first stage firmware in an isolated memory region of to the IP agent. The BIOS also places the public keys required to verify 2nd stage FW including any 3rd party FW keys. BIOS programs the IP register Interface that's accessible only to IP's trusted entities with location information of isolated memory region and location of verified FW and key material.

Later in the boot process the BIOS exits and jumps to the operating system image. The operating system loads the IP agent's driver, which copies IP agent's firmware from the operating system file system into system memory and bring the IP's controller out of reset. Out of reset, either the ROM in the IP agent or a firmware state machine jumps to boot-loader location, programmed by trusted BIOS. From here, bootloader takes control and is responsible for verifying driver loaded firmware. It copies driver loaded firmware from hos accessible system memory to IP's protected memory and verifies the FW using the key material placed by BIOS in the isolated memory region IMR to copy and verify driver loaded firmware from system memory to local SRAM and flush it to isolated memory region.

Details of an example process will be described with reference to FIGS. 3-4.

Figure 3:
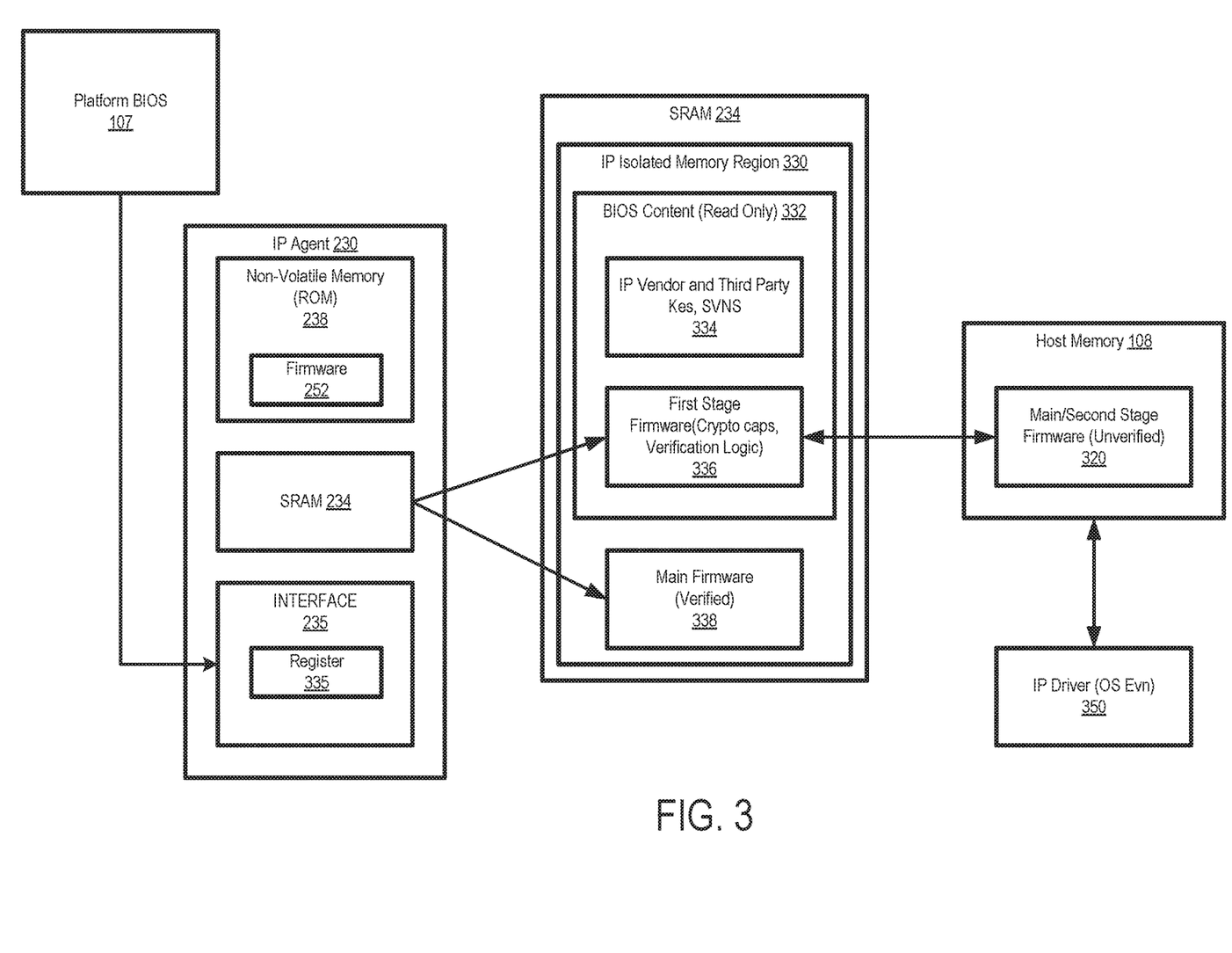
FIG. 3 is a schematic illustration of various components of a platform configured to implement non-ROM based IP firmware verification downloaded by host software, according to embodiments.

FIG. 3 is a schematic illustration of various components of a platform configured to implement non-ROM based IP firmware verification downloaded by host software, according to embodiments. Referring to FIG. 3, the components comprise a platform BIOS 107, one or more IP agents 230, a host memory 108, and an IP driver 350. The one or more IP agents 230 comprise a non-volatile memory (e.g., a ROM) 238 capable to hold firmware 252, a static random access memory (SRAM) 234, and an interface 235, as described above, comprising one or more registers 335. SRAM 234 comprises an isolated memory region 330.

Figure 4:
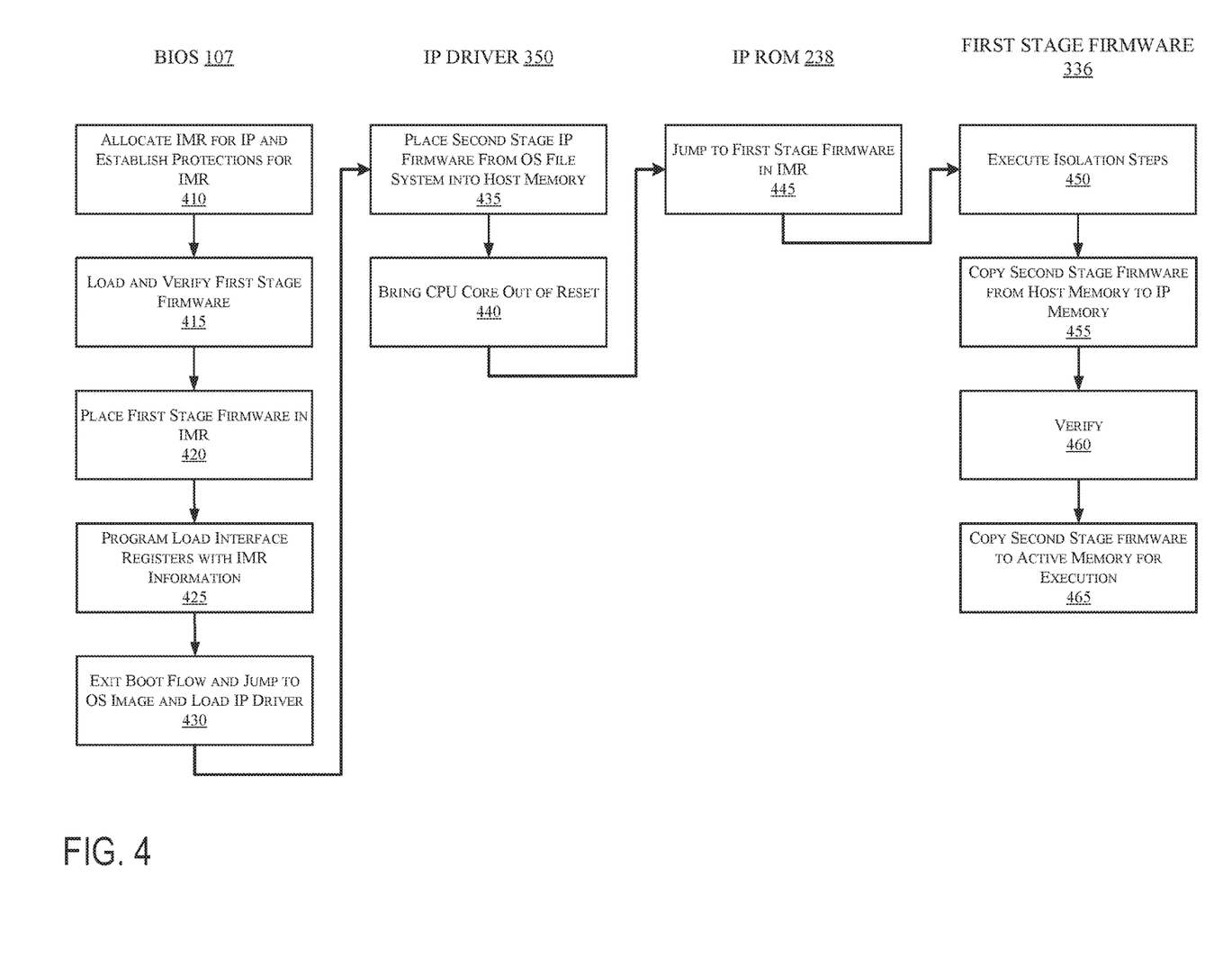
FIG. 4 is a flow diagram illustrating operations in a method to implement non-ROM based IP firmware verification downloaded by host software, according to embodiments.

FIG. 4 is a flow diagram illustrating operations in a method to implement an IP independent secure firmware load, according to embodiments. In some examples, the operations depicted in FIG. 4 may be implemented by BIOS 107 of the computing device 100.

Referring to FIG. 4, at operation 410 the BIOS 107 allocates an isolated memory region (IMR) 330 in the SRAM 234 of an IP agent 230. As described above, BIOS 107 may also establish protections for the isolated memory region 330, which are enforced by hardware of the SOC 100.

At operation 415 the BIOS 107 loads and verifies the first stage firmware from external memory. At operation 420 the BIOS 107 places the verified first stage firmware 336 in the isolated memory region 330. In some examples the BIOS 107 may also place boot information 334 including the public keys required to enable the IP agent 230 to verify the second stage firmware and any third party firmware into the isolated memory region 330. At operation 425 the BIOS 107 programs the load interface register(s) 335 of the IP agent 230 with location information (i.e., memory address offset information) of the isolated memory region 330 and the location (i.e., memory address offset) of the verified first stage firmware and any public keys in the isolated memory region 330. At operation 430 the BIOS 107 exits the boot flow and allows the boot flow process to jump to the operating system 106, which loads a driver 350 for the IP agent 230.

At operation 435 the driver 350 copies the second stage firmware for the IP agent from a host file managed by the file system of the operating system 106 into host system memory. At operation 440 the driver 350 brings the CPU core(s) responsible for the process out of a reset state. After coming out of reset, either the ROM 238 in the IP agent 230 or a firmware state machine jumps (operation 445) to the boot-loader location which was programmed by trusted BIOS to execute the first-stage firmware 336 in the BIOS content 332 section of the isolated memory region 330.

At operation 450 the first stage firmware is executed (e.g., by a bootloader) and performs any additional isolation steps required for the IP agent 230. For example, the BIOS contents 332 in the isolated memory region 330 may be marked as read only by the IP agent 230, as illustrated in FIG. 3, to prevent malicious or buggy firmware from overwriting contents placed in the BIOS content section 332 of the isolated memory region 330.

At operation 455 the unverified second stage firmware 320 is copied from host memory 108 to the memory of IP agent 230. For example, the second stage firmware may be copied into the SRAM 234 of IP agent 230. At operation 460 the second stage firmware is verified, e.g., using the verification information 334 provided in operation 410. At operation 465 the verified second stage firmware 338 is copied into the isolated memory region 330 of SRAM 234 for execution by the IP agent 230.

Thus, the structure of FIG. 3 and the operations depicted in FIG. 4 permit a two-stage firmware loading process. The first stage firmware eliminates the need to include a dedicated ROM in the IP agent for cryptographic capabilities, embedded keys, etc. It also eliminates the requirement for communication between IP agents to get the firmware verified. Further, implementing verification support in first stage firmware instead of dedicated ROM in the IP agents reduces or eliminates the requirement for ROM and contributes to a ROM size reduction of 32-64 KB. To address security issues, silicon issues, and additional capabilities and modes, a release of first stage firmware would suffice in-lieu of a silicon stepping for a ROM change. This helps reduce platform/SOC risk. Finally, a two-stage process results in improved responsiveness as the IP agent does not have to rely on CSME or other IP for its verification capabilities to deliver IP functionality promptly.

Figure 5:
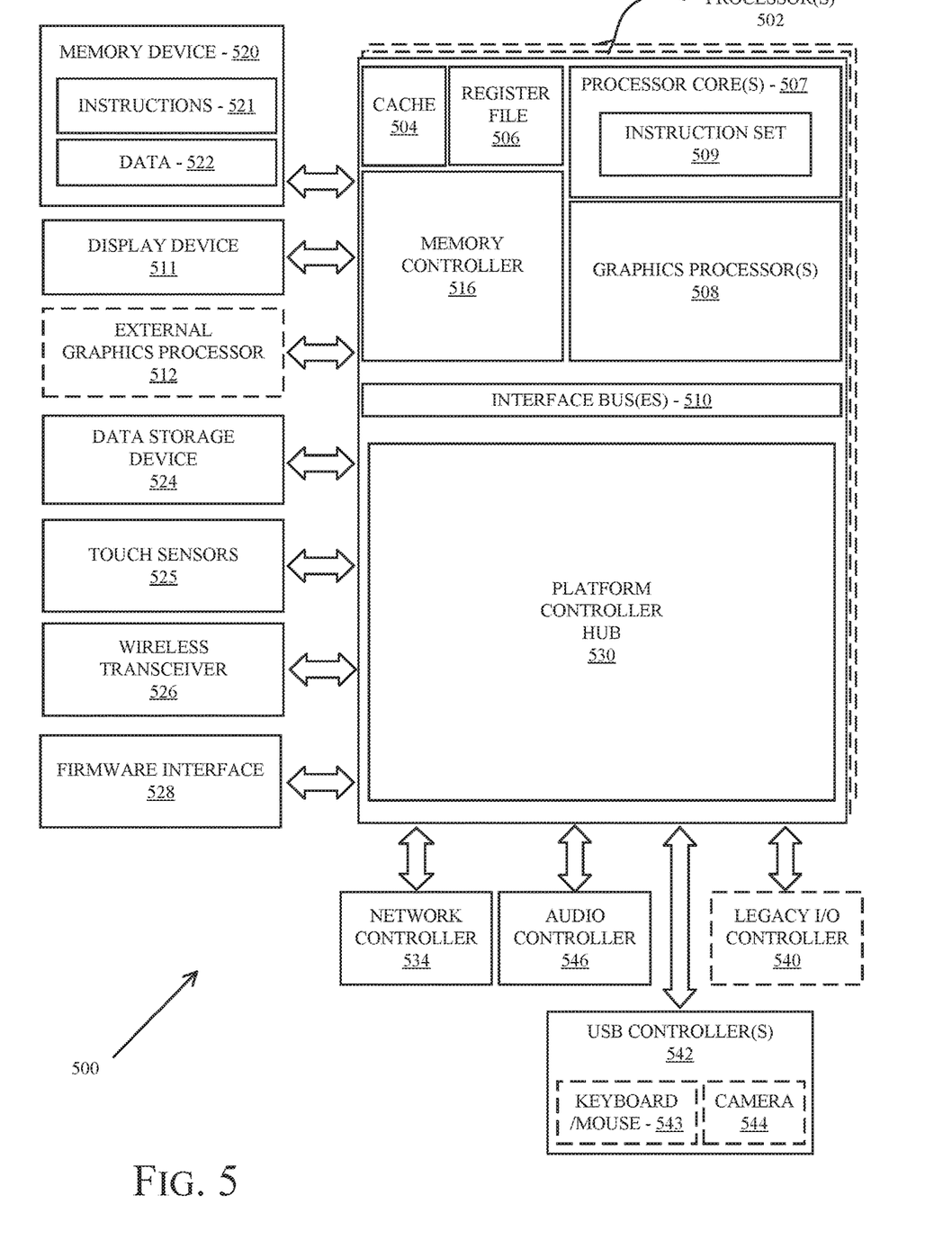
FIG. 5 is a schematic illustration of an electronic device which may be adapted to implement non-ROM based IP firmware verification downloaded by host software, according to embodiments.

FIG. 5 is a schematic illustration of an electronic device which may be adapted to implement an IP independent secure firmware load, according to embodiments. In various embodiments, the computing architecture 500 may comprise or be implemented as part of an electronic device. In some embodiments, the computing architecture 500 may be representative, for example of a computer system that implements one or more components of the operating environments described above. In some embodiments, computing architecture 500 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes one or more processors 502 and one or more graphics processors 508, and may be a single processor desktop system, a multiprocessor workstation system, or a server system having a large number of processors 502 or processor cores 507. In on embodiment, the system 500 is a processing platform incorporated within a system-on-a-chip (SoC or SOC) integrated circuit for use in mobile, handheld, or embedded devices.

An embodiment of system 500 can include, or be incorporated within a server-based gaming platform, a game console, including a game and media console, a mobile gaming console, a handheld game console, or an online game console. In some embodiments system 500 is a mobile phone, smart phone, tablet computing device or mobile Internet device. Data processing system 500 can also include, couple with, or be integrated within a wearable device, such as a smart watch wearable device, smart eyewear device, augmented reality device, or virtual reality device. In some embodiments, data processing system 500 is a television or set top box device having one or more processors 502 and a graphical interface generated by one or more graphics processors 508.

In some embodiments, the one or more processors 502 each include one or more processor cores 507 to process instructions which, when executed, perform operations for system and user software. In some embodiments, each of the one or more processor cores 507 is configured to process a specific instruction set 509. In some embodiments, instruction set 509 may facilitate Complex Instruction Set Computing (CISC), Reduced Instruction Set Computing (RISC), or computing via a Very Long Instruction Word (VLIW). Multiple processor cores 507 may each process a different instruction set 509, which may include instructions to facilitate the emulation of other instruction sets. Processor core 507 may also include other processing devices, such a Digital Signal Processor (DSP).

In some embodiments, the processor 502 includes cache memory 504. Depending on the architecture, the processor 502 can have a single internal cache or multiple levels of internal cache. In some embodiments, the cache memory is shared among various components of the processor 502. In some embodiments, the processor 502 also uses an external cache (e.g., a Level-3 (L3) cache or Last Level Cache (LLC)) (not shown), which may be shared among processor cores 507 using known cache coherency techniques. A register file 506 is additionally included in processor 502 which may include different types of registers for storing different types of data (e.g., integer registers, floating point registers, status registers, and an instruction pointer register). Some registers may be general-purpose registers, while other registers may be specific to the design of the processor 502.

In some embodiments, one or more processor(s) 502 are coupled with one or more interface bus(es) 510 to transmit communication signals such as address, data, or control signals between processor 502 and other components in the system. The interface bus 510, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 502 include an integrated memory controller 516 and a platform controller hub 530. The memory controller 516 facilitates communication between a memory device and other components of the system 500, while the platform controller hub (PCH) 530 provides connections to I/O devices via a local I/O bus.

Memory device 520 can be a dynamic random-access memory (DRAM) device, a static random-access memory (SRAM) device, flash memory device, phase-change memory device, or some other memory device having suitable performance to serve as process memory. In one embodiment the memory device 520 can operate as system memory for the system 500, to store data 522 and instructions 521 for use when the one or more processors 502 executes an application or process. Memory controller hub 516 also couples with an optional external graphics processor 512, which may communicate with the one or more graphics processors 508 in processors 502 to perform graphics and media operations. In some embodiments a display device 511 can connect to the processor(s) 502. The display device 511 can be one or more of an internal display device, as in a mobile electronic device or a laptop device or an external display device attached via a display interface (e.g., DisplayPort, etc.). In one embodiment the display device 511 can be a head mounted display (HMD) such as a stereoscopic display device for use in virtual reality (VR) applications or augmented reality (AR) applications.

In some embodiments the platform controller hub 530 enables peripherals to connect to memory device 520 and processor 502 via a high-speed I/O bus. The I/O peripherals include, but are not limited to, an audio controller 546, a network controller 534, a firmware interface 528, a wireless transceiver 526, touch sensors 525, a data storage device 524 (e.g., hard disk drive, flash memory, etc.). The data storage device 524 can connect via a storage interface (e.g., SATA) or via a peripheral bus, such as a Peripheral Component Interconnect bus (e.g., PCI, PCI Express). The touch sensors 525 can include touch screen sensors, pressure sensors, or fingerprint sensors. The wireless transceiver 526 can be a Wi-Fi transceiver, a Bluetooth transceiver, or a mobile network transceiver such as a 3G, 4G, or Long Term Evolution (LTE) transceiver. The firmware interface 528 enables communication with system firmware, and can be, for example, a unified extensible firmware interface (UEFI). The network controller 534 can enable a network connection to a wired network. In some embodiments, a high-performance network controller (not shown) couples with the interface bus 510. The audio controller 546, in one embodiment, is a multi-channel high definition audio controller. In one embodiment the system 500 includes an optional legacy I/O controller 540 for coupling legacy (e.g., Personal System 2 (PS/2)) devices to the system. The platform controller hub 530 can also connect to one or more Universal Serial Bus (USB) controllers 542 connect input devices, such as keyboard and mouse 543 combinations, a camera 544, or other USB input devices.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus comprising a plurality of agents, at least one agent including an isolated memory region accessible only to a trusted entity of the at least one agent; and a main memory; and a processor to allocate a section of the isolated memory region of the at least one agent; verify a first stage firmware module, the first stage firmware module comprising instructions to enable the at least one agent to load and verify a second stage firmware module; place the first stage firmware module into the isolated memory of the at least one agent; and place the second stage firmware module in a host memory accessible to the at least one agent.

Example 2 includes the subject matter of Example 1, the processor to load a public key associated with the first stage firmware module into the isolate memory region.

Example 3 includes the subject matter of Examples 1 and 2, the processor to load a secure version number (SVN) associated with the first stage firmware module into the isolate memory region.

Example 4 includes the subject matter of Examples 1-3, the processor to program a load interface register of the at least one agent with IMR information.

Example 5 includes the subject matter of Examples 1-4, wherein the load interface register is locked after the IMR information is loaded.

Example 6 includes the subject matter of Examples 1-5, the processor to load an IP driver.

Example 7 includes the subject matter of Examples 1-6, wherein the at least one agent is to copy the second stage firmware from the host memory to the main memory of the at least one agent; and verify the second stage firmware.

Some embodiments pertain to Example 8 that includes a processor implemented method comprising allocating a section of an isolated memory region of the at least one agent of a plurality of agents, the isolated memory region accessible only to a trusted entity of the at least one agent; verifying a first stage firmware module, the first stage firmware module comprising instructions to enable the at least one agent to load and verify a second stage firmware module; placing the first stage firmware module into the isolated memory of the at least one agent; and placing the second stage firmware module in a host memory accessible to the at least one agent.

Example 9 includes the subject matter of Example 8, further comprising loading a public key associated with the first stage firmware module into the isolate memory region.

Example 10 includes the subject matter of Examples 8 and 9, further comprising loading a secure version number (SVN) associated with the first stage firmware module into the isolate memory region.

Example 11 includes the subject matter of Examples 8-10, further comprising program a load interface register of the at least one agent with IMR information.

Example 12 includes the subject matter of Examples 8-11, wherein the load interface register is locked after the IMR information is loaded.

Example 13 includes the subject matter of Examples 8-12, further comprising loading an IP driver.

Example 14 includes the subject matter of Examples 8-13, further comprising copying the second stage firmware from the host memory to the main memory of the at least one agent; and verifying the second stage firmware.

Some embodiments pertain to Example 15, that includes at least one non-transitory computer readable medium having instructions stored thereon, which when executed by a processor, cause the processor to allocate a section of an isolated memory region of the at least one agent of a plurality of agents, the isolated memory region accessible only to a trusted entity of the at least one agent; verify a first stage firmware module, the first stage firmware module comprising instructions to enable the at least one agent to load and verify a second stage firmware module; place the first stage firmware module into the isolated memory of the at least one agent; and place the second stage firmware module in a host memory accessible to the at least one agent.

Example 16 includes the subject matter of Example 15, further comprising instruction which, when executed by processor, cause the processor to load a public key associated with the first stage firmware module into the isolate memory region.

Example 17 includes the subject matter of Examples 15 and 16, further comprising instruction which, when executed by processor, cause the processor to load a secure version number (SVN) associated with the first stage firmware module into the isolate memory region.

Example 18 includes the subject matter of Examples 15-17, further comprising instruction which, when executed by processor, cause the processor to program a load interface register of the at least one agent with IMR information.

Example 19 includes the subject matter of Examples 15-18, further comprising instruction which, when executed by processor, wherein the load interface register is locked after the IMR information is loaded Example 20 includes the subject matter of Examples 15-19, further comprising instruction which, when executed by processor, cause the processor to load an IP driver.

Example 21 includes the subject matter of Examples 15-20, wherein the at least one agent is to copy the second stage firmware from the host memory to the main memory of the at least one agent; and verify the second stage firmware.

The details above have been provided with reference to specific embodiments. Persons skilled in the art, however, will understand that various modifications and changes may be made thereto without departing from the broader spirit and scope of any of the embodiments as set forth in the appended claims. The foregoing description and drawings are, accordingly, to be regarded in an illustrative rather than a restrictive sense.

What is claimed is:

1. An apparatus comprising:
a plurality of agents, at least one agent including:
a function that is achieved by firmware without utilizing a ROM to establish the hardware root of trust for a firmware;
an interface for firmware loading and verification;
a main memory; and
a processor to:
allocate a section of an isolated memory region of the at least one agent;
verify a first stage firmware module, the first stage firmware module comprising instructions to enable the at least one agent to load and verify a second stage firmware module;
provide the first stage firmware module to a memory of the at least one first agent without a ROM;
program a load interface register of the at least one agent with a memory address offset of the isolated memory region and a memory address offset of the verified first stage firmware and one or more public keys in the isolated memory region; and
place the second stage firmware module in a host memory accessible to the at least one agent.

2. The apparatus of claim 1, the processor to:
load a public key associated with the first stage firmware module into the isolated memory region.

3. The apparatus of claim 1, the processor to:
load a secure version number (SVN) associated with the first stage firmware module into the isolate memory region.

4. The apparatus of claim 1, the processor to:
program a load interface register of the at least one agent with IMR information.

5. The apparatus of claim 4, wherein the load interface register is locked after the IMR information is loaded.

6. The apparatus of claim 1, the processor to:
load an IP driver.

7. The apparatus of claim 6, wherein the at least one agent is to:
copy the second stage firmware from the host memory to the main memory of the at least one agent; and
verify the second stage firmware.

8. A processor-implemented method, comprising:
allocating a section of an isolated memory region of the at least one agent of a plurality of agents, the isolated memory region accessible only to a trusted entity of the at least one agent;
verifying a first stage firmware module, the first stage firmware module comprising instructions to enable the at least one agent to load and verify a second stage firmware module;
providing the first stage firmware module to a memory of the at least one first agent without a ROM;
programming a load interface register of the at least one agent with a memory address offset of the isolated memory region and a memory address offset of the verified first stage firmware and one or more public keys in the isolated memory region; and
placing the second stage firmware module in a host memory accessible to the at least one agent.

9. The method of claim 8, further comprising
loading a public key associated with the first stage firmware module into the isolate memory region.

10. The method of claim 8, further comprising:
loading a secure version number (SVN) associated with the first stage firmware module into the isolate memory region.

11. The method of claim 8, further comprising:
programming a load interface register of the at least one agent with IMR information.

12. The method of claim 11, wherein the load interface register is locked after the IMR information is loaded.

13. The method of claim 8, further comprising:
loading an IP driver.

14. The method of claim 13, further comprising:
copying the second stage firmware from the host memory to the main memory of the at least one agent; and
verifying the second stage firmware.

15. At least one non-transitory computer readable medium having instructions stored thereon, which when executed by a processor, cause the processor to:
allocate a section of an isolated memory region of the at least one agent of a plurality of agents, the isolated memory region accessible only to a trusted entity of the at least one agent;
verify a first stage firmware module, the first stage firmware module comprising instructions to enable the at least one agent to load and verify a second stage firmware module;
provide the first stage firmware module to a memory of the at least one first agent without a ROM;
program a load interface register of the at least one agent with a memory address offset of the isolated memory region and a memory address offset of the verified first stage firmware and one or more public keys in the isolated memory region; and
place the second stage firmware module in a host memory accessible to the at least one agent.

16. The computer readable medium of claim 15, further comprising instruction which, when executed by processor, cause the processor to:
   load a public key associated with the first stage firmware module into the isolate memory region.

17. The computer readable medium of claim 15, further comprising instruction which, when executed by processor, cause the processor to:
   load a secure version number (SVN) associated with the first stage firmware module into the isolate memory region.

18. The computer readable medium of claim 15, further comprising instruction which, when executed by processor, cause the processor to:
   program a load interface register of the at least one agent with IMR information.

19. The computer readable medium of claim 18, wherein the load interface register is locked after the IMR information is loaded.

20. The computer readable medium of claim 15, further comprising instruction which, when executed by processor, cause the processor to:
   load an IP driver.

21. The computer readable medium of claim 20, wherein the at least one agent is to:
   copy the second stage firmware from the host memory to the main memory of the at least one agent; and
   verify the second stage firmware.

* * * * *